Patented Aug. 17, 1937 2,090,109

UNITED STATES PATENT OFFICE 2,090,109

STABILIZED INSECTICIDE OF PLANT ORIGIN

Mayne R. Coe, Washington, D. C.

No Drawing. Application November 15, 1933, Serial No. 698,077

11 Claims. (Cl. 167—24)

(Granted under the act of March 3, 1883, as amended April 30, 1928; 370 O. G. 757)

This application is made under the Act of March 3, 1883, as amended by the Act of April 30, 1928, and the invention herein described, if patented, may be manufactured and used by or for the Government for governmental purposes without payment to me of any royalty thereof.

The object of my invention is to provide a means and process for delaying or preventing deterioration of the active principal of certain commodities commonly exposed to ordinary light. Specifically, it is found that such substances as rotenone, nicotine dust, pyrethrum powder or flowers commonly used as insecticides, either in the form of a spray or powder, becomes ineffective for killing insects after only a short exposure to natural, ordinary light or sunlight. While these insecticides are extremely toxic to insects at the time they are placed on the insect invested plants, they lose most of their potency to destroy the insects in a few hours after being sprayed or dusted on the plants. There they are exposed to ordinary light resulting in a photochemical reaction which causes a loss of potency in the particular necessary. The potency of an insecticide may of course be preserved prior to use by enclosing it in a light proof container made of black or opaque material. I have found, however, that certain light rays are not injurious to the insecticides named and other materials of a similar character. If these inert or helpful rays of light only are admitted the insecticide retains its potency as if all light had been excluded. The harmless, inert or helpful rays of light as determined by me lie within that portion of the visible spectrum beginning at 4900 Ångström units of the spectrum and including the entire upper portion of the visible spectrum, although it is found that the more effective protection and preservation is offered by the greens lying within the range given above, for example, chlorophyll green in particular, and orange yellow or shades of orange and yellow which exclude the visible spectrum below 4900 Ångström units of the spectrum. It may be stressed that the substances to be protected are least effected adversely when they are protected by chlorophyll green, that is to say, when these substances are enclosed by a chlorophyll green transparent screen, the photochemical reaction causing loss of toxic potency is at a minimum. By chlorophyll green is meant the green pigment in the plant kingdom having a spectral transmission beginning with 5270 to and including 6500 Ångström units of the visible spectrum.

An object of the invention is to give the desired protection to substances such as the insecticides named when in use and after they have been sprayed or dusted on the plants treated. This is accomplished by utilizing a properly colored gelatin, glucose, gelatinized starch, dextrine, emulsions or other suitably colored globule forming vehicle as a color screen for enclosing the particles, that is the subdivided particles of the substance to be protected. In the case of insecticides the enclosing globule forming substance should not of course be repellent to insects or interfere with them eating the toxic principal. It will also be realized that the gelatin glucose, emulsions, etc., serve as a means to retain by its adhesive tendency, the protected substance or toxic principal on the plant or surface to which it is applied.

As an example of the application of my invention, a liquid gelatin is formed by dissolving the gelatin in water. The resulting liquid gelatin is then colored with a water soluble chlorophyll green dye which may be made of thiocarmine blue and tartrazine yellow. Powdered rotenone is then added to the chlorophyll green liquid gelatin. The amount of rotenone to be used is governed by the desired toxic strength of the insecticide, and sufficient water is added to bring the suspension to the desired consistency for spraying purposes.

In the above example, nicotine dust or pyrethrum powder or flowers may be substituted for the rotenone and glucose or emulsions etc., may be substituted for the gelatin. Likewise, the color screen may be formed of an orange yellow dye, or the colors above 4900 Ångström units of the visible spectrum, although chlorophyll green and orange yellow are preferable. A black pigment or opaque substance may be used in forming the color screen by the use of which all light is excluded from the particles of the substance being protected.

If it is desired to keep the protected substance in powder form or to use the protected insecticide as a dust, the liquid insecticide disclosed above is sprayed or atomized into a drying or heated enclosure or chamber, whereupon the spray particles, which are in the form of globules composed of a particle or particles (grains) of rotenone, nicotine dust etc., as the case may be, enveloped in a protecting screen of colored gelatin, glucose etc., becomes a dry powder and falls to the bottom of the chamber, the powder being composed of the active or toxic insecticidic principal enclosed in the colored screen. This insecticidal powder may be used to dust plants or may be dissolved in water for use as a spray. The last mentioned spray material possesses the same attributes as the previous spray material before it was reduced to powder form. The powdered form of my unique protected insecticide is particularly adapted to shipment.

It may be added that the use of a chlorophyll green screen is particularly desirable in the protection of insecticides because of its harmony in color with plants and its attraction to insects.

It may also be added that extracts of rotenone, nicotine dust etc., may be emulsified with the color used, especially chlorophyll green, the emulsified liquid acting as a protective screen.

It is obvious that the above invention may be applied to the protection from light or other injurious agencies, of substances other than those mentioned above, by enclosing the subdivided particles of substances in a protecting film by the procedure described above.

Having fully disclosed my invention, I claim:

1. A composition of matter comprising a suspension of a powdered insecticide of plant origin subject to deterioration by ordinary light, in a colored globule forming liquid of adhesive tendency and non-repellent to insects, the color of the globule forming liquid having a spectral transmission of above 4900 Ångström units of the visible spectrum.

2. A composition of matter comprising a suspension of a powdered insecticide of plant origin subject to deterioration by ordinary light, in a chlorophyll green globule forming liquid having an adhesive tendency and non-repellent to insects.

3. A composition of matter comprising a powdered insecticide of plant origin subject to deterioration by ordinary light, the subdivided insecticidal particles of which are coated with a dry colored film formed in contact with said particles, said film also having an adhesive tendency when such matter is suspended in water the color of the film having a spectral transmission of above 4900 Ångström units of the spectrum.

4. A composition of matter comprising a powdered insecticide of plant origin subject to deterioration by ordinary light, the individual insecticidal particles of which are coated with a dry chlorophyll green film formed in contact with said particles, said film also having an adhesive tendency when said matter is suspended in water.

5. A composition of matter, comprising an insecticide of plant origin subject to deterioration by ordinary light the individual particles of which insecticide are coated with and enclosed in a protective medium which excludes all light below 4900 Ångström units of the spectrum.

6. A composition of matter comprising nicotine dust the individual particles of which are coated with a dry film having a spectral transmission of above 4900 Ångström units of the spectrum.

7. A composition of matter comprising rotenone, the individual particles of which are coated with a dry film having a spectral transmission of above 4900 Ångström units of the spectrum.

8. A composition of matter comprising pyrethrum powder, the individual particles of which are coated with a dry film having a spectral transmission of above 4900 Ångström units of the spectrum.

9. A composition of matter comprising nicotine dust the individual particles of which are coated with a dry chlorophyll green film.

10. A composition of matter comprising rotenone the individual particles of which are coated with a dry chlorophyll green film.

11. A composition of matter comprising pyrethrum powder the individual particles of which are coated with a dry chlorophyll green film.

MAYNE R. COE.